United States Patent [19]

Moon et al.

[11] Patent Number: 5,577,072
[45] Date of Patent: Nov. 19, 1996

[54] TIMING PHASE DETECTOR AND TIMING RECOVERY USING THE SAME

[75] Inventors: Hee C. Moon, Kyoungki-do; Kyoung H. Chun, Kyoungsangbuk-do, both of Rep. of Korea

[73] Assignee: Hyundai Electronics Industries Co., Ltd., Seoul, Rep. of Korea

[21] Appl. No.: 399,652

[22] Filed: Mar. 7, 1995

[30]     Foreign Application Priority Data

Mar. 7, 1994 [KR] Rep. of Korea ................. 94-4372
Mar. 16, 1994 [KR] Rep. of Korea ................. 94-5230

[51] Int. Cl.[6] .................................................. H04L 27/36
[52] U.S. Cl. .......................... 375/298; 375/261; 375/340
[58] Field of Search ............................... 375/261, 295, 375/298, 355, 340; 332/103; 364/725, 726

[56]             References Cited

U.S. PATENT DOCUMENTS 4,017,859  4/1977  Medwin ............................. 455/137
5,187,719  2/1993  Biroenheier et al. ............... 375/261
5,199,078  3/1993  Orglmeister ......................... 381/47

Primary Examiner—Stephen Chin
Assistant Examiner—T. Ghebretinsae
Attorney, Agent, or Firm—Wigman, Cohen, Leitner & Myers, P.C.

[57]              ABSTRACT

A timing phase detector and timing recovery using a quadrature amplitude modulation is disclosed including a 4-point fast Fourier transforming portion for Fourier-transforming a digital output signal from an analog-to-digital converter; a sum/dump portion for adding and outputting the output of the 4-point fast Fourier transforming portion; and a cordic portion for calculating the phase of a complex number so as to indicate the output of the sum/dump portion on the X-Y coordinates.

5 Claims, 8 Drawing Sheets

FIG.1
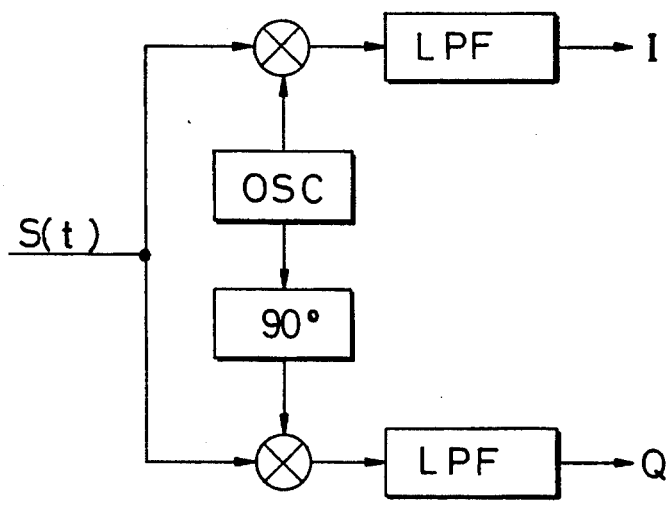
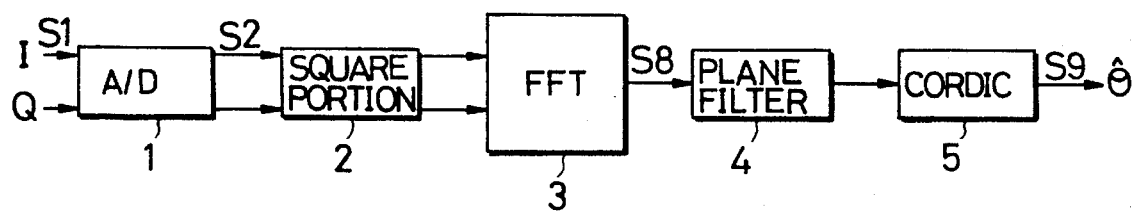

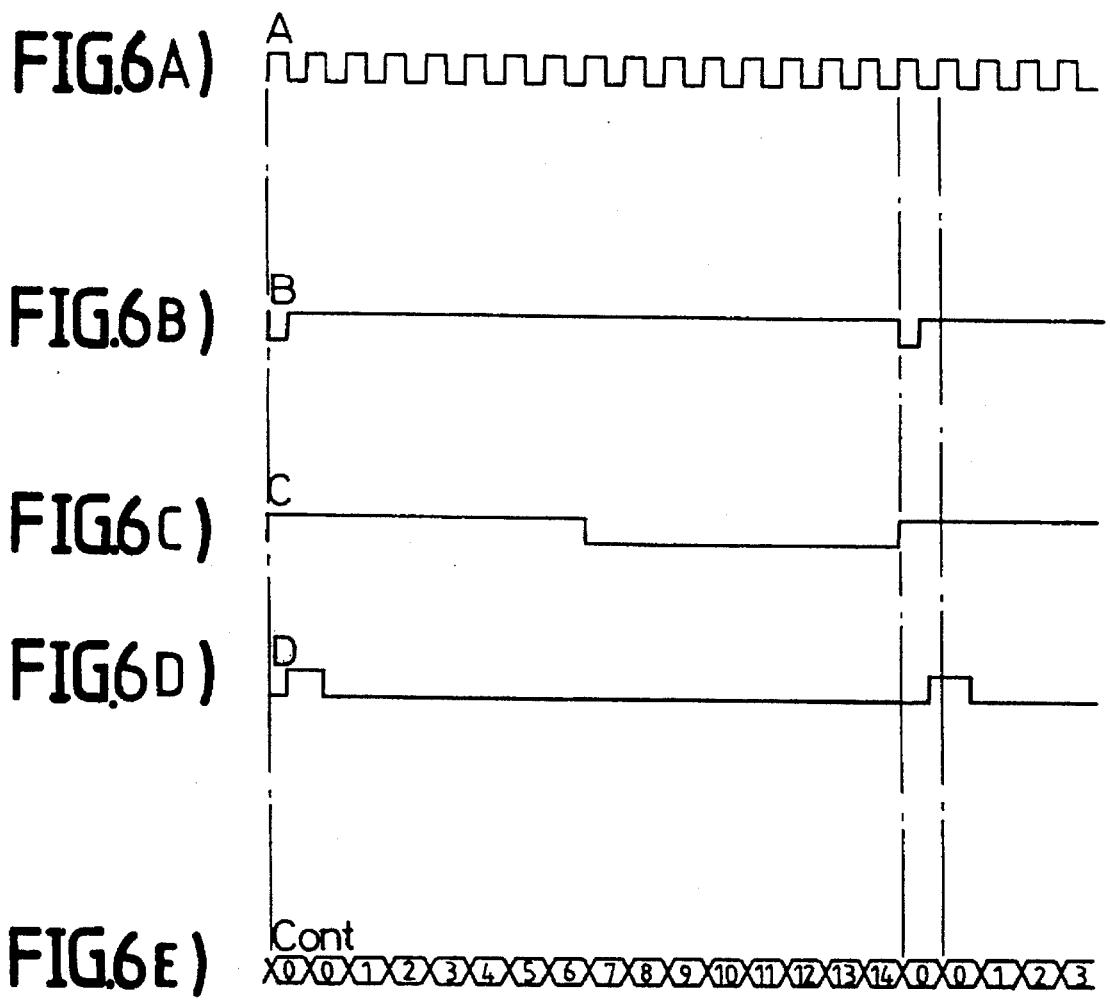

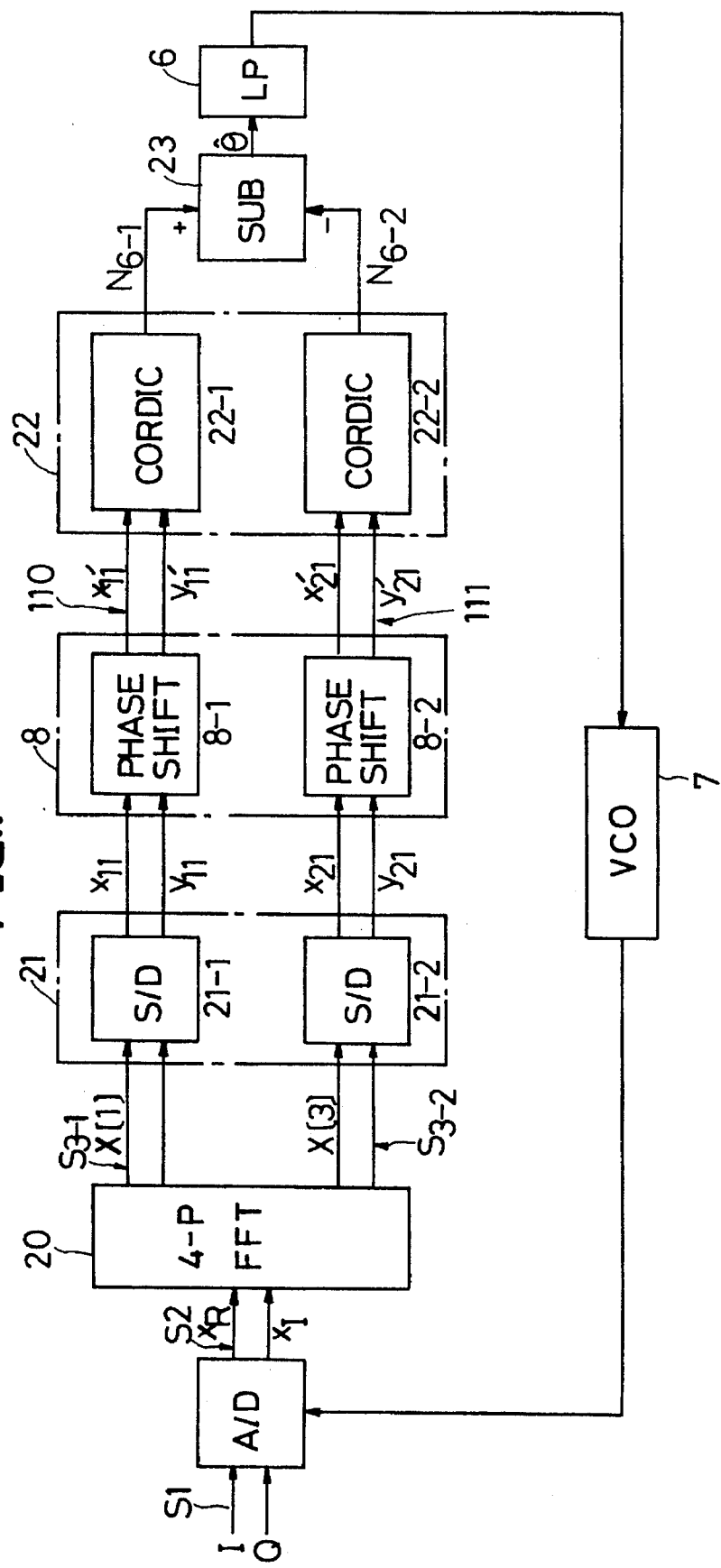

TIMING PHASE DETECTOR AND TIMING RECOVERY USING THE SAME

BACKGROUND OF THE INVENTION

The present invention relates to a timing phase detector using a four-point fast Fourier transform (hereinafter refer to as FFT), and more particularly, to a timing phase detector used in a timing recovery for converting an analog signal into a digital signal in a digital high-definition television for ground broadcasting using a quadrature amplitude modulation (QAM), or a digital receiver for digital satellite communication or satellite broadcast using a quadrature phase shift keying (QPSK).

A timing phase error estimation algorithm used in a conventional QAM signal mode roughly is divided into a decision-dependence mode and a band-edge component maximization (BECM) mode. The decision-dependence mode samples once for one symbol period so that the sampling speed is fast in a digital communication system in which a transmission speed is rapid. However, the mode requires too many memory devices and much operation, as compared with other modes.

The BECM is to minimize the average square error of the output of an equalizer when a sampled received signal passes through the equalizer. For this, it uses a method of reducing a probability that null is created in the spectrum of a digital signal in which the received signal is sampled with a symbol frequency. The spectral null is produced because the signals of ±½ a symbol frequency have different phases. Therefore, the BECM is a method of properly controlling the sampling time of the received signal so that the signals of ±½ the symbol frequency have the same phase The BECM includes a baseband analog mode, band-pass digital mode, and FFT-used mode. At present, the technology development advances toward a trend from analog to digital for the application software integrated circuit (ASIC). The baseband analog mode is out-of-date. The band-pass digital mode involves complicated hardware because it includes a complex-band filter and complex multiplier therein.

The fast Fourier transformation method includes a timing phase error estimation algorithm ("Digital filter and square timing recovery," IEEE Trans. on Comm., Vol. 36, No. 5, pp. 605–612, May 1988) proposed by Oerder and Meyr in 1988, and an algorithm ("A novel frequency domain method for symbol timing recovery and its application in multi-carrier demodulation," Signal Processing IV: Theories and Applications, ed. J. Vandewalle, R. Boite, M. Moonen, and A. Dosterlinck. Amsterdam: Elsevier, 1992) suggested by Barton in 1992. The meyr's replaces a conventional temporal filter with a spectral filter using the Fourier transformation. The block diagram of the algorithm is as shown in FIG. 1.

As depicted in FIG. 1, a baseband analog input signal S1 is applied to an analog-to-digital (A/D) converter 1. The output S2 of A/D converter 1 passes through a square portion 2, FFT portion 3, plane filter portion 4, and cordic (coordinate rotation digital computer) portion 5, and is output as a timing phase error estimation value.

The output S8 of FFT portion 3 contains the phase error component of the signals detached by ±½ the symbol frequency among input signals. Plane filter 4 makes the output S8 of FFT portion 3 pass directly through a low-band-pass filter in the complex number area, minimizing hangup that the timing phase detector has. However, the square circuit is hard to implement in hardware. Further, in the circuit the bandwidth of a signal spectrum is doubled eventually to sample four times for every symbol.

In the A-Jalili's, given that the timing phase error is constant, equation (1) can be obtained from two signal components detached as long as the symbol frequency on the spectrum of the received signal.

$$\hat{\theta} = \frac{1}{2\pi} arg(S(f,\theta) - arg(S(f+1/T\theta) - arg(H(f+1/T)), \quad (1)$$

Where T is the period of a symbol;
S(f) is the spectrum of a received signal; and
H(f) is the spectrum of the whole waveform.

In this case, suppose that H(f) is a function with a constant phase, that is, $-arg(H(f+1/T))$ is 0 or a constant value, the A1-Jalili's algorithm can be exampled as shown in FIG. 2. The received signal S1 is converted into a digital signal S2 in A/D converter 1, and applied to FFT portion 10. The FFT outputs $S_{5-1}–S_{5-4}$ in accordance with the number of windows of FFT portion 10 are applied to corresponding cordics 11-4 through 11-4 of cordic portion 11 to calculate the phase value. Respective outputs $S_{6-1}–S_{6-4}$ of cordic portion 11 pass through a subtracting portion 12 of a pair of subtractors 12-1 and 12-2, and an average portion 13 so as to calculate timing phase error estimation value S7.

This method needs no square circuit unlike the Meyr's, and avoids widening the spectral bandwidth of signal so that the overlap of signal spectrum does not occur though sampling is performed twice for every symbol. However, as the window of FFT portion 10 increases, the amount of hardware also swells. Further, several pairs of signal components detached as long as symbol frequency 1/T are used to increase the hardware of cordic portion 11.

For another FFT-related method, U.S. Pat. No. 5,199,078 is known. In this disclosure, a digital audio signal is divided into overlap time window segments for the purpose of FFT. The FFT-transformed segments are grouped in frequencies to obtain the average. This method is advantageous in replacing several-magnitude values with one value. However, the hardware for dividing and processing a signal into several segments is complicated.

SUMMARY OF THE INVENTION

Therefore, it is an object of the present invention to provide a timing phase detector using FFT in which a 4-point FFT is used, and 4-point FFT outputs are added to calculate the phase of a complex number so that the configuration of FFT is simplified, and that the hardware amount of a cordic for calculating the phase of a complex number is reduced.

It is another object of the present invention to provide a timing recovery in which a timing phase error is estimated by 90° phase-shifting the output of a sum/dump, using a 4-point FFT and sum/dump method, thereby preventing the variation of timing phase error estimation value in accordance with bandwidth.

To accomplish the first object of the present invention, there is provided a timing phase detector using a quadrature amplitude modulation comprising: a 4-point fast Fourier transforming portion for Fourier-transforming a digital output signal from an analog-to-digital converter; a sum/dump portion for adding and outputting the output of the 4-point fast Fourier transforming portion; and a cordic portion for calculating the phase of a complex number so as to indicate the output of the sum/dump portion on the X-Y coordinates.

To accomplish the second object of the present invention, there is provided a timing recovery using a quadrature amplitude modulation comprising: a 4-point fast Fourier transforming portion for Fourier-transforming a digital output signal from an analog-to-digital converter; a sum/dump portion for adding and outputting the output of the 4-point fast Fourier transforming portion; a phase shifter for phase-shifting the output of the sum/dump portion by 90°, and providing the phase-shifted output to a cordic portion; and a cordic portion for calculating the phase of a complex number so as to indicate the phase-shifted output on the X-Y coordinates.

BRIEF DESCRIPTION OF THE ATTACHED DRAWINGS

FIG. 1 is a block diagram of a Meyr-mode fast-Fourier-transformed (FFT) timing phase detector;

FIGS. 6A–6E are timing diagrams present at respective components of the present invention;

FIG. 7 is a block diagram of a timing recovery of the present invention;

DETAILED DESCRIPTION OF THE INVENTION

In order to solve such drawbacks, this Inventor has studied and found the following principle.

The present invention uses the principle in which an input signal is divided into L blocks by N samples, N-point individual Fourier transformation is carried out for the respective blocks, and the transformation results are summed so that a K-th component of vector is the same as K'=KL-th component of vector which is the result of LN-point individual Fourier transformation.

This principle can be proven by the following Fourier transformation equation. If N-point individual Fourier transformation is added L times, equation (2) is obtained.

$$\sum_{m=0}^{L-1} X_{k,m} = \sum_{m=0}^{L-1} \sum_{n=mN}^{(m+1)N-1} x_n e^{-j2\pi(n-mn)k/N} \quad \text{equation (2)}$$

$$= \sum_{m=0}^{L-1} \sum_{n=mN}^{(m+1)N-1} x_n e^{j2\pi nk/N}$$

$$= \sum_{n=0}^{LN-1} x_n e^{j2\pi nk/N}, k = 0, 1, \ldots, N-1$$

When the LN-point individual Fourier transformation is performed, $$X_{k'} = \sum_{n=0}^{LN-1} x_n e^{-j2\pi nk'/LN}, k = 0, 1, \ldots, LN-1 \quad \text{equation (3)}$$

In other words, the same result is obtained only when k'=kL.

Therefore, the present invention roughly is to implement a timing phase detector by using 4N-point FFT portion in which the input number of the FFT is 4, and the outputs of 4-point FFT are added four times. In addition, not Hxing several pairs of signal components detached as long as 1/T in frequency, only the representative ±½T signal component is used thereamong. This does not increase the complexity and amount of hardware.

Figure 2:
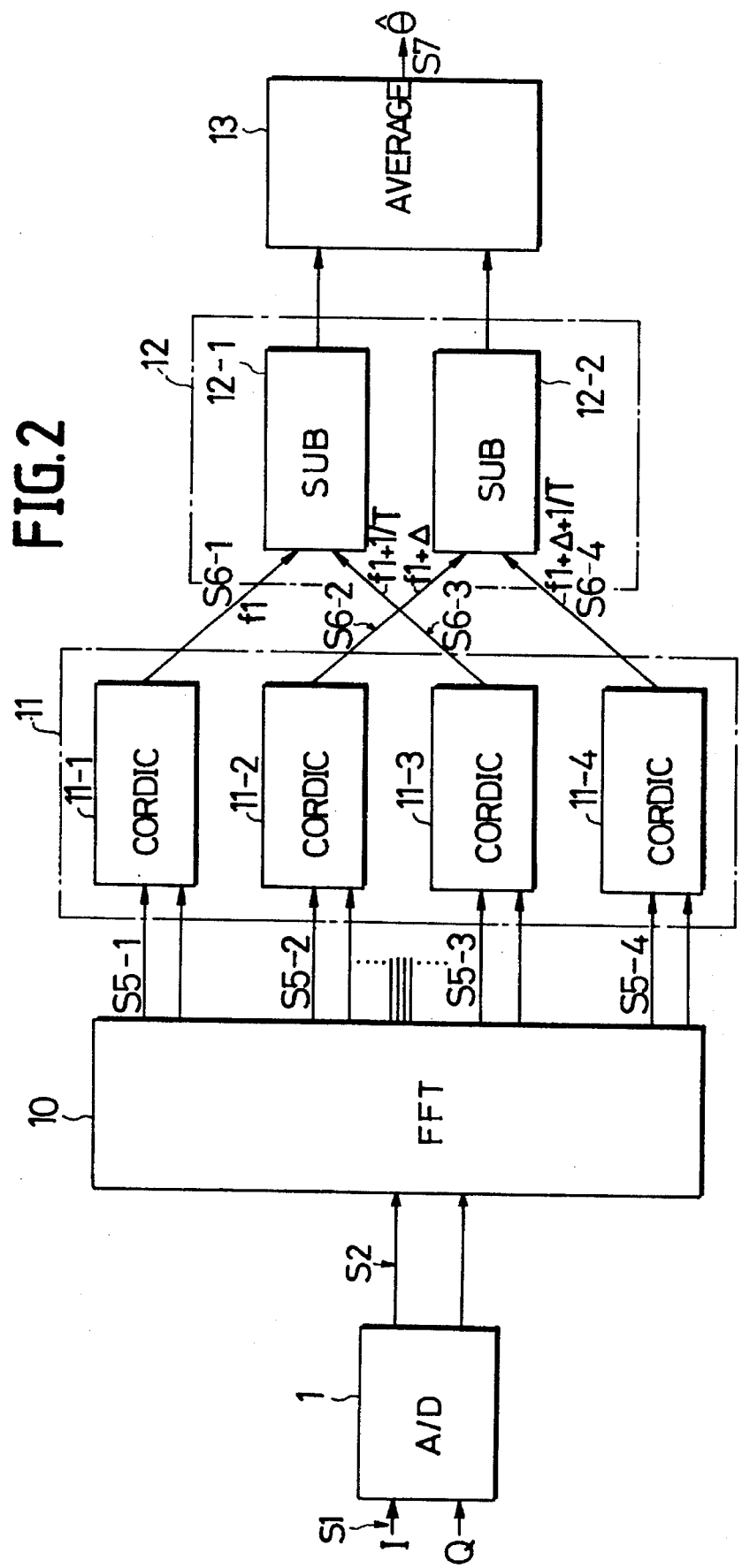
FIG. 2 is a block diagram of an AL-Jalili-mode FFT phase detector.
Figure 3:
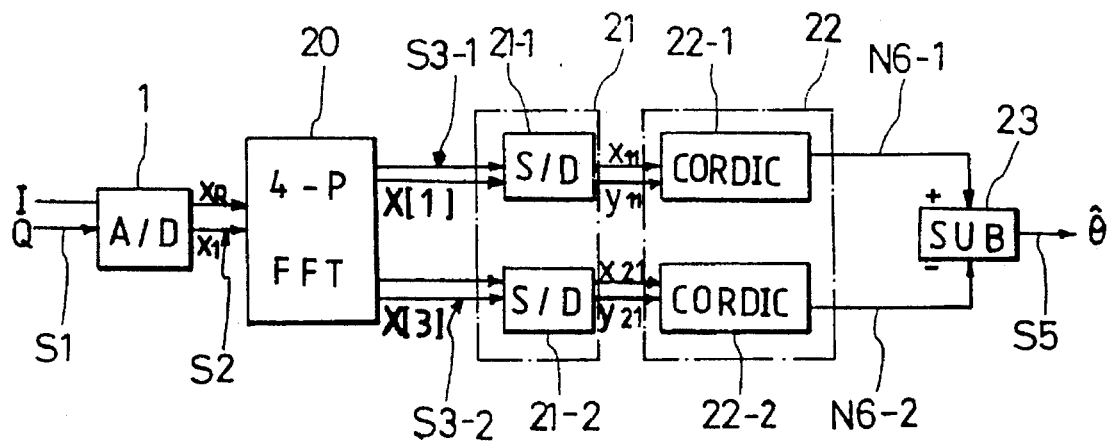
FIG. 3 is a block diagram of an FFT timing phase error of the present invention.

The present invention comprises an FFT portion, a sum/dump (S/D) portion, and a subtractor, as shown in FIG. 3.

In FIG. 3, a baseband analog input signal $S_1$ made up of components I and Q is applied to an A/D converter 1. The output $S_2$ of A/D converter 1 is applied to 4-point FFT portion 20. The outputs $S_{3-1}$ and $S_{3-2}$ of FFT portion 20 pass through sum/dump portion 21, and cordic portion 22. The outputs are output as timing phase error estimation value (S5) $\theta$ in subtracting portion 23.

Here, the 4-point FFT portion is noted to be made up of a shift register, adder, and a subtractor, as shown in equation 4. This simplifies the structure.

$$X[k] = \sum_{n=0}^{3} x(n) e^{-\frac{\pi}{2} nk} \quad \text{equation (4)}$$

(for k = 0, 1, 2, 3)

$$X[3] = x(0) + x(1)e^{-j\frac{3}{2}\pi} + x(2)e^{j\pi} + x(3)e^{-j\frac{\pi}{2}}$$
(for $X[3] = X[3]_R + jX[3]_I$)

$X[1]_R = x(0)_R - x(1)_I - x(2)_R - x(2)_I$
$X[1]_I = x(0)_I - x(1)_R - x(2)_I - x(3)_R$
$X[3]_R = x(0)_R - x(1)I - x(2)_R - x(3)_I$
$X[3]_I = x(0)_I + x(1)_R - x(2)_I - x(3)_R$ (If k is 0,2, the above equation is not used for the phase detector. $X[1]_I$ and $X[3]_I$ are imaginary values, and $X[3]_R$ and $X[1]_R$ are real values.)

Figure 4:
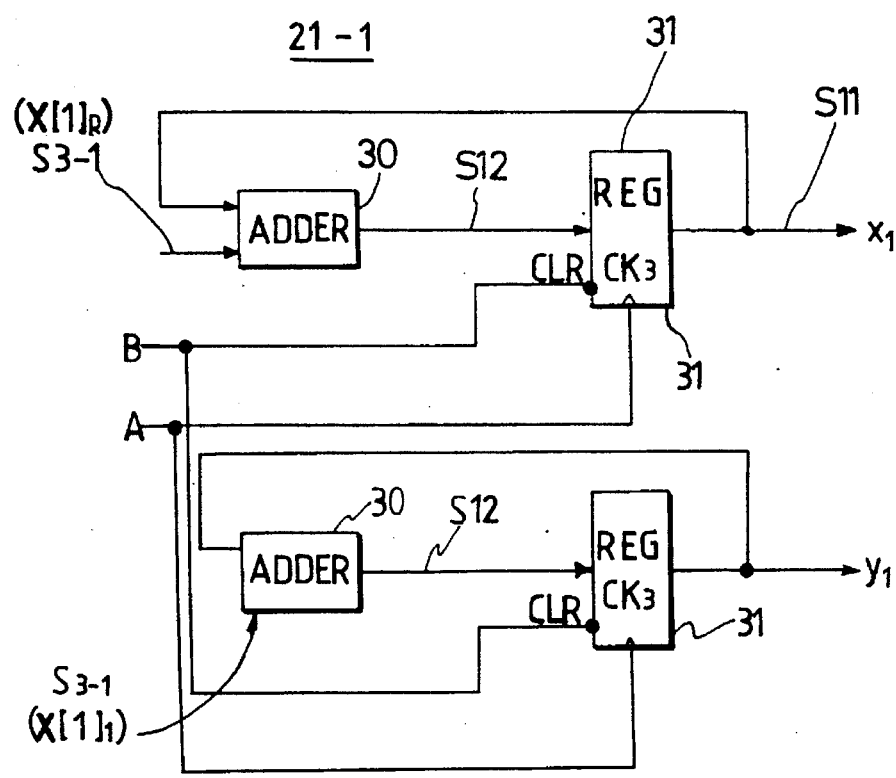
FIG. 4 is a block diagram of a sum/dump portion of the present invention.

In FIG. 4, S/D 21-1 of S/D portion 21 is made up of pair of adders 30 for receiving the output signal $S_{3-1}$ of 4-point FFT portion 20 as one input; and a pair of registers 31 for storing the output $S_{12}$ of adders 30, sending back the stored value to adders 30 as the other input, and repeatedly storing the added value to output the value at the same time. Clock A is applied to the clock port CK3 of the register. Clear signal B is applied to clear port CLR. If the output of 4-point FFT portion 20 is added fifteen or sixteen times in S/D portion 21, 4-point FFT portion 20 and S/D portion 21 function for 60 or 64-point FFT. When the window of FFT is larger, the bandwidth of the output component of the FFT is smaller. As the bandwidth is narrower, the estimation value is closer to the timing phase error. However, as the bandwidth is narrower, a delay time in obtaining an accurate estimation value increases, retarding the reaction of the whole timing restoration system with respect to the variation of timing of the received signal. Therefore, the size of window should be determined according to specifications. When a system is designed to control the size of window, the system can be used more flexibly.

Cordic portion 22 calculates the phase of a complex number input. If there is input $(X_{11}, Y_{11})$, it outputs 74 satisfying $(X_{11}, Y_{11}) - \sqrt{X_{11}^2 + Y_{11}^2} e^{j\theta}$. Cordic portion 22 performs such an algorithm as equation (5).

$$Y_{12} = \zeta_{11} X_{11}$$

$$X_{12} = \zeta_{11} X_{11}$$

(for $\zeta_{11}$ is the MSB of $Y_{11}$. "1" is 1, and "0" is −1.)

$$Y_{1i+1} = Y_{1i} + \zeta_{1i} 2^{-(i-2)} X_{1i}$$

$$X_{1i+1} = X_{1i} - \zeta_{1i} 2^{-(i-2)} Y_{1i}, \quad i \geq 2$$

$$\lambda_{1i} = \sum_{j=1}^{i} \zeta_{1j} \alpha_j$$

(for $\alpha_j$ is an ATR (Arc Tangent Radix) digit table. $\alpha_1$ −90°, $\alpha_j$-arctan ($2^{-j}$), and $j \geq 2$)

Figure 5:
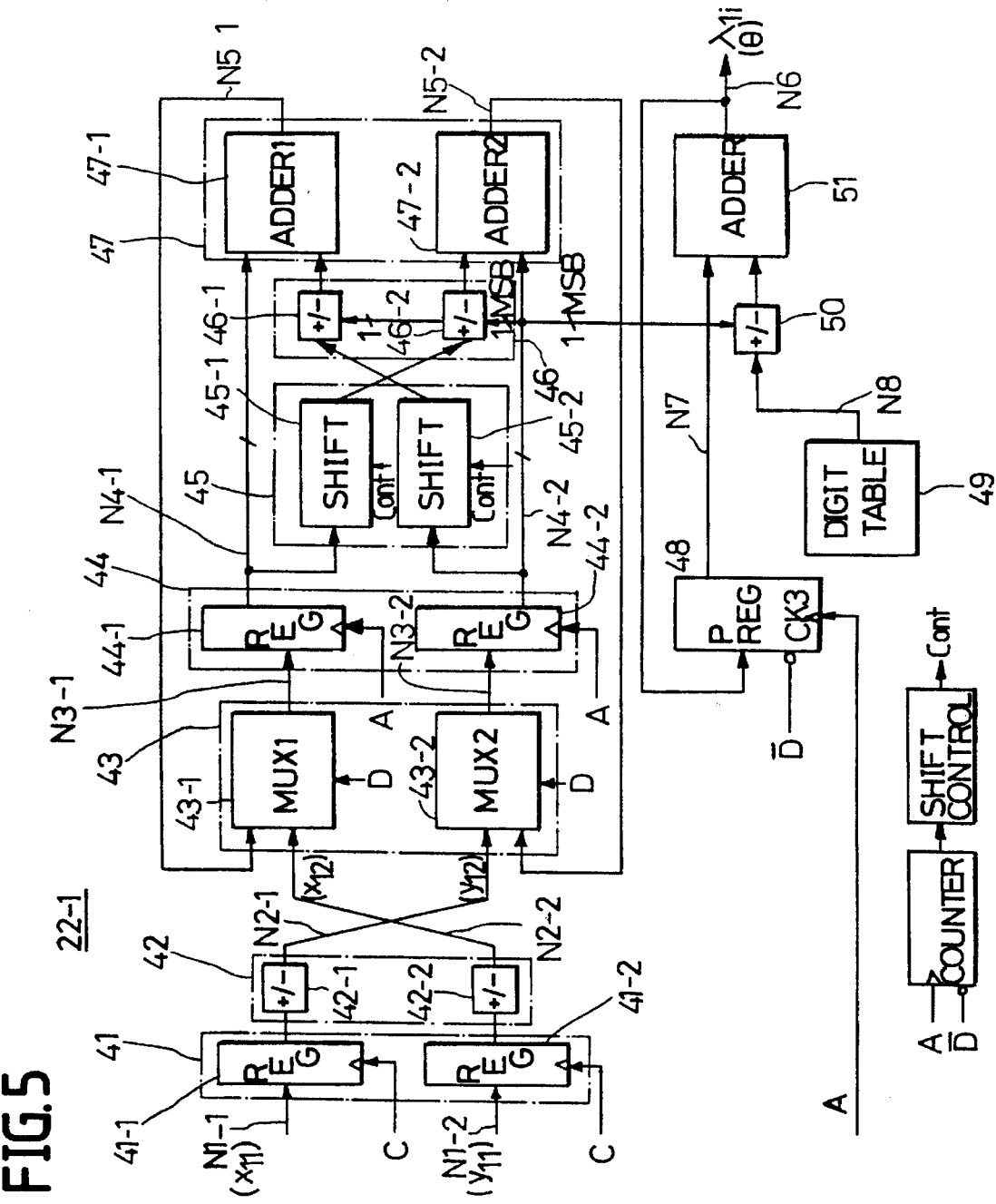
FIG. 5 is a block diagram of a cordic portion of the present invention.

The hardware block diagram of the above algorithm is shown in FIG. 5. Outputs $N_{1-1}$, $N_{1-2}$ from one of S/Ds 21-2, 21-2 of S/D portion 21 are applied to registers 41-1, 41-2 of input register portion 41. The outputs of the respective input registers 41-1, 41-2 pass through sign converters 42-1, 42-2 of sign converter portion 42, and output as signals $N_{2-1}$, $N_{2-2}$. Here, sign converter portion 42 is controlled by the MSB ($\zeta_{11}$ in equation (5)) of input register portion 41-2. Signals $N_{2-1}$, $N_{2-2}$ correspond to ($X_{12}$, $Y_{12}$) of equation (5). Signals ($N_{2-2}$, $N_{5-1}$) and ($N_{2-1}$, $N_{5-2}$), as pairs, are applied to first and second MUXs 43-1, 43-2 of MUX portion 43. The outputs $N_{3-1}$, $N_{3-2}$ of MUX portion 43 are determined by a MUX control signal D. Outputs $N_{3-1}$, $N_{3-2}$ of MUX portion 43 are applied to registers 44-1, 44-2 of internal register portion 44. Outputs $N_{4-1}$, $N_{4-2}$ are fed simultaneously to one port of adder 47 and to shift gate portion 45. The outputs of shift gates 45-1, 45-2 of shift gate portion 45 are applied to converters 46-2, 46-1 of sign converter 46. The outputs of converters 46-2, 46-1 are applied to the other port of adder 47. The outputs $N_{5-1}$, $N_{5-2}$ of first and second adders 47-1, 47-2 of adder 47 is applied as the other input of first and second MUXs 43-1 and 43-2.

Sign converter 46 is controlled by the MSB of internal register portion 44-2. The bit shift amount of shift gate portion 45 is determined through a control logic. The output $N_8$ of table portion 49 is applied to adder 51 along with the output $N_7$ of phase register portion 48 through sign converter 50 controlled by the MSB of internal register 44-2. Output $N_6$ of the adder is applied to phase register portion 48. For the output of cordic, the adder output $N_6$, precision over 16 bits generally is not required. Therefore, this operation is performed until output ($N_6$)i=15, outputting 15 bits.

The above operation will be described with the timing diagrams shown in FIGS. 6A–6E.

Input ($X_{11}$, $Y_{11}$) of cordic portion 22 and the output $\lambda_{1i}$(i=16) are input/output in synchronization with the clock of FIG. 6C.

FIG. 6D illustrates MUX control signal D for controlling first and second MUXs 43-1, 43-2 of MUX portion 43. If the signal D is "0," MUX portion 43 outputs the output of adder 47. If the signal D is "1," the output $N_{2-2}$, $N_{2-1}$ of sign converter 42 is output. FIG. 6B is a clear signal B present at sum/dump 21-1 of FIG. 4 and for clearing register 31.

FIG. 6E is a control signal CON, the control signal of shift gate portion 45, which shifts as much as the values designated in the drawing.

As a result, in FIG. 5, the upper portion including MUX portion 43 and adder 47 receives input signal ($X_{11}$, $Y_{11}$), and if $(x_{11}, y_{11}) - \sqrt{x_{11}^2 + y_{11}^2} e^{j\theta}$ is satisfied, internal register 44-1 converts the input signal into $\sqrt{x_{11}^2 + y_{11}^2}$. Internal register 44-2 converts the input signal into "0."

Meanwhile, in FIG. 5, the lower portion having phase register portion 48 and adder 51 repeats a step of discriminating the sign of MSB of internal register 44-2 to obtain value "0," out of the operation of the upper portion of FIG. 5.

The output $N_6$ is divided into outputs $N_{6-1}$, $N_{6-2}$, in FIG. 3. Output $N_{6-1}$ has a phase of the signal component that is +½ the symbol frequency, with output $N_{6-2}$ containing the signal component of −½ the symbol frequency. The difference between these two values is the timing phase error estimation value $\hat{\theta}$. Through a computer program experiment, estimation value $\hat{\theta}$ of the timing phase detector exhibits such a characteristic as shown in FIG. 9.

Figure 9:
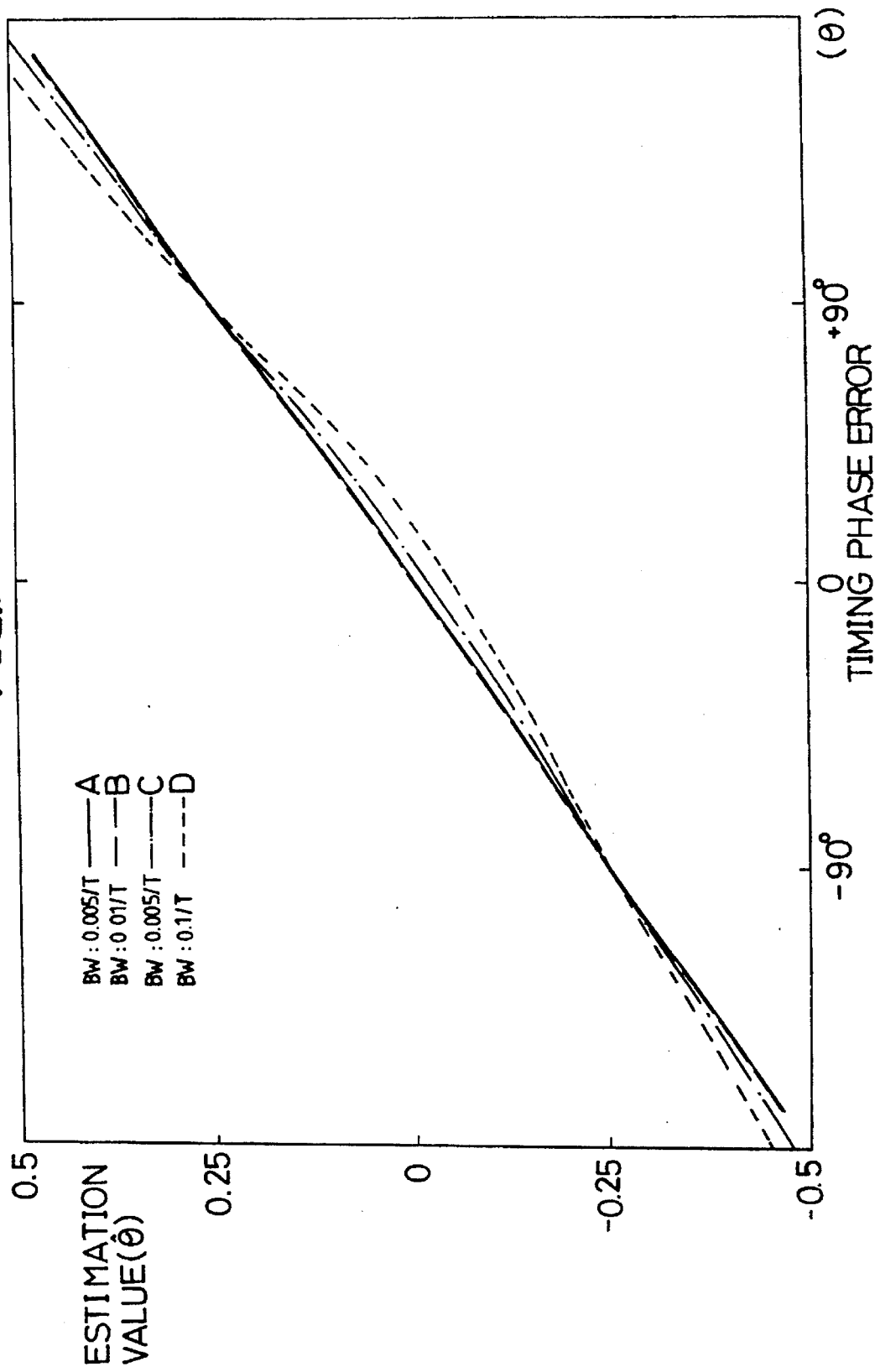
FIG. 9 illustrates phase error estimation characteristic graphs in the timing recovery of the present invention.

In FIG. 9, phase error estimation value characteristic graphs A, B, C and D are shown with respect to example values bandwidths 0.005/T, 001/T, 0.05/T, and 0.1/T at a point where the timing phase error is "0." to Around a point where the timing phase error is 0°, the timing phase error estimation value $\hat{\theta}$ output in accordance with bandwidth, which is the number of windows of 4-point FFT 20, can be explained as below. If the bandwidth is large, the timing reaction speed becomes faster, but an accurate phase error value cannot be obtained in the characteristic graphs C and D. This is because the timing phase error increases as the bandwidth becomes larger. If the bandwidth is small as in the graphs A and B, the estimation value approximates the timing phase error. However, as the bandwidth is smaller, the reaction speed of the timing recovery system becomes slower. For this reason, there should be an adjustment between the two factors.

When the timing phase error is −π/2 or −π/2, it can be obtained exactly, regardless of the number of window of FFT. According to this fact, a quadrature-lock loop can be formed, which shifts the phase error so that the timing phase error converges on ±π/2, as depicted in FIG. 7.

The timing recovery of FIG. 7 comprises: an A/D converter 1 to which a baseband analog input signal S1 is applied; a 4-point FFT portion 20 for receiving the output digital signal S2 of A/D converter 1 and obtaining an FFT value by using a shift register, adder, and subtractor; a sum/dump portion 21 of a pair of sum/dumps 21-1, 21-2 for adding output signals $S_{3-1}$, $S_{3-2}$ of 4-point FFT portion 20 sixteen times, respectively, so as to perform a 64-point individual FFT function and thereby control the bandwidth of the outputs; a phase shift portion 8 of a pair of phase shifters 8-1, 8-2 for receiving outputs ($X_{11}$, $Y_{11}$), ($X_{21}$, $Y_{21}$) of sum/dumps 21-1, 21-2, and shifting their phases by 90° or −90° according to a selection signal sel so that if the error is large, the gain of the timing phase detector becomes large to quicken the convergence speed, and if the error is small, the gain becomes small to obtain a stable clock after the convergence; a cordic portion 22 of a pair of cordics 22-1, 22-2 for calculating the phase of the complex number input so as to indicate 90°- or −90°-phase-shifted outputs 110 and 111 of phase shifters 8-1 and 8-2 on the X-Y coordinates; a subtracting portion 23 for obtaining the difference between the output signal $N_{6-1}$ of cordic portion 22, which has the phase of signal component +½ the symbol frequency, and the output signal $N_{6-2}$ of cordic 22 which has the phase of signal component −½ the symbol frequency, and outputting the timing phase error estimation value; a loop filter 6 for receiving the output of subtracting portion 23 and feeding it to a voltage controlled oscillator and voltage controlled oscillator 7 for applying a clock-generating signal to A/D converter 1 according to the phase error estimation value output through loop filter 6. This timing recovery is configured as FIG. 3. However, the difference is that the output of sum/dump portion 21 is phase-shifted by 90° or −90°, and fed to cordic portion 22.

Briefly, the signals output from sum/dumps 21-1, 21-2 are shifted by 90° or −90° in phase, and pass through cordics 22-1, 22-2 for calculating the phase of the complex number input so that a 90° or −90° phase-shifted timing phase error estimation value is output from subtracting portion 23. The signal output from subtracting portion 23 is input to voltage controlled oscillator 7 for applying the clock-generating signal to A/D converter 1 according to the phase error estimation value via loop filter 6. The signal of the voltage controlled oscillator is input to A/D converter 1.

In this timing recovery, as shown in FIG. 9, the timing phase error converges on 90° or −90° so that if the timing phase error is large, the gain of the phase detector becomes large to quicken the convergence speed, and if the error is small, the gain becomes small to obtain a stable clock.

Figure 8A:
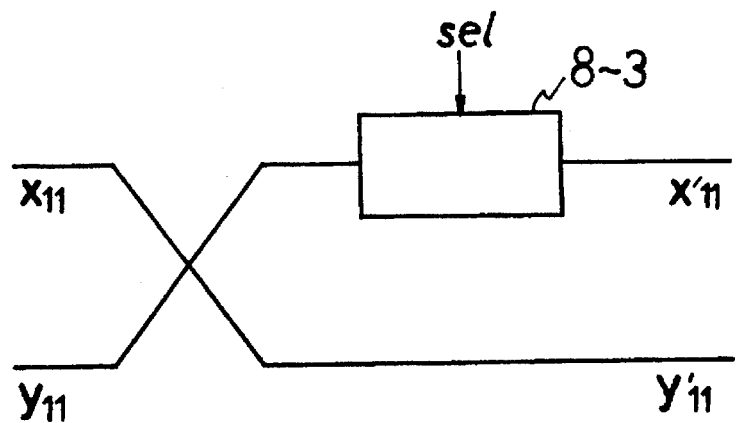
FIG. 8A illustrates a phase shifter having −90° phase offset in the timing recovery.

For the configuration of phase shifter 8, sign converter 8-3 for converting a sign according to a quadrature select signal (sel) is provided as in FIG. 8A. In FIG. 8A, the phase shifter is locked at −90°, which is expressed as in equation (6).

$$(X_{11}',Y_{11}')=(-Y_{11}', X_{11}') \quad (6)$$

Figure 8B:
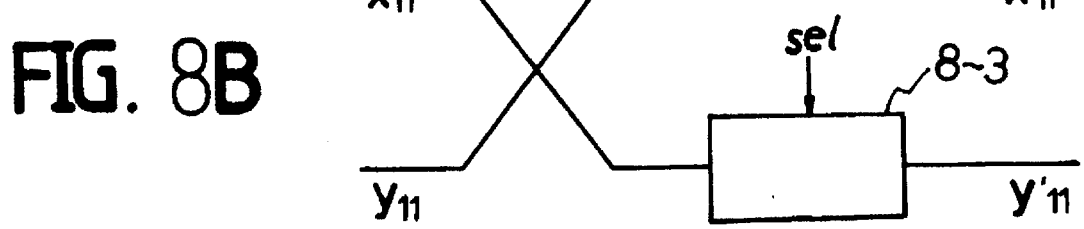
FIG. 8B illustrates a phase shifter having +90° phase offset in the timing recovery.

In FIG. 8B, the phase shifter is locked at 90°, which can expressed as in equation (7).

$$(X_{11}',Y_{11}')=(Y_{11}',X_{11}') \quad (7)$$

Figure 8C:
FIG. 8C illustrates a phase shifter having 0 phase offset in the timing recovery.

In FIG. 8C, $(X_{11}',Y_{11}')=(Y_{11}',X_{11}')$, as in FIG. 3. Forming a timing recovery with 90° phase shift is possible because a 90°-phase-shifted A/D output value can be corrected by using such an equalizer as fractional spaced equalizer. In a system not using fractional spaced equalizer, the 90° phase shift must be off.

As described above, the present invention sharply reduces the amount of hardware, as compared with the conventional BECM algorithm. Further, this invention needs no square circuit like Meyr's. It is sufficient that the sampling speed of an analog signal is twice the symbol frequency. Furthermore, unlike Al-Jalili's, this invention does not use large-window FFT but 4-point FFT, yielding a great advantage in implementing hardware. Due to the small amount of hardware, the application software integrated circuit can be made only with one chip. In addition, the timing phase error converges on 90° or −90° so that if the timing phase error is large, the convergence speed is quickened, and if the error is small, a stable clock is obtained.

What is claimed is:

1. A timing phase detector using quadrature amplitude modulation comprising:

a 4-point fast Fourier transforming portion for Fourier-transforming a digital output signal from an analog-to-digital converter to provide. an output signal;

a sum-dump portion for adding and outputting the output signal of said 4-point fast Fourier transforming portion; and a cordic portion for calculating the phase of a complex number so as to indicate the output of said sum/dump portion on an X-Y coordinate.

2. A timing phase detector using quadrature amplitude modulation as claimed in claim 1, wherein said sum/dump portion comprises:

a pair of adders for receiving the output signal of said 4-point fast Fourier transforming portion as one input and providing an output; and a pair of registers for storing the output of said adders, sending back the stored output to said adders as a second input, and repeatedly storing the added value to output the value at the same time.

3. A timing recovery arrangement using quadrature amplitude modulation comprising:

a 4-point fast Fourier transforming portion for Fourier-transforming a digital output signal from an analog-to-digital converter to provide an output signal;

a sum/dump portion for adding and outputting the output signal of said 4-point fast Fourier transforming portion;

a phase shifter for phase-shifting the output of said sum/dump portion by 90° , and providing a phase-shifted output; and a cordic portion for receiving the phase-shifted output and calculating the phase of a complex number so as to indicate the phase-shifted output on an X-Y coordinate.

4. A timing recovery arrangement using a quadrature amplitude modulation as claimed in claim 3, wherein said phase shifter comprises a sign converter for performing sign conversion according to a sign conversion selection signal.

5. A timing recovery arrangement using quadrature amplitude modulation comprising:

an A/D converter for receiving a baseband analog input signal and producing an output digital signal;

a 4-point FFT portion for receiving said output digital signal of said A/D converter and obtaining an FFT value by using a shift register, an adder, and a subtractor to produce output signals;

a sum/dump portion of a pair of sum/dump for adding the output signals of said 4-point FFT portion sixteen times, respectively, so as to perform a 64-point individual FFT function;

a phase shift portion of a pair of phase shifters for receiving outputs of said sum/dumps, and shifting their phases by 90° or −90° according to a selection signal so that if the error is large, the gain of a timing phase detector becomes large to quicken the convergence speed, and if the error is small, the gain becomes small to obtain a stable clock after the convergence; Pl a cordic portion of a pair of cordics for calculating the phase of a complex number input so as to indicate 90°-phase-shifted or −90°-phase-shifted outputs of said phase shifters on an X-Y coordinate;

a subtracting portion for obtaining the difference between one output signal of said cordic portion, which has the phase of signal component +½ of a symbol frequency, and the other output signal of said cordic portion, which has the phase of signal component −½ of the symbol frequency, and providing a timing phase error estimation value as an output;

a loop filter for receiving the output of said subtracting portion and providing it as a timing phase error estimation value output; and a voltage-controlled oscillator for receiving said timing phase error estimation value output from said loop filter. and for applying a clock-generating signal to said A/D converter in accordance therewith.

* * * * *